(12) United States Patent
Turri et al.

(10) Patent No.: US 6,683,128 B2
(45) Date of Patent: Jan. 27, 2004

(54) ADDITIVES FOR HYDROGENATED RESINS

(75) Inventors: Stefano Turri, Milan (IT); Aldo Sanguineti, Milan (IT); Massimo Scicchitano, Milan (IT)

(73) Assignee: Ausimont S.p.A., Milan (IT)

( * ) Notice: Subject to any disclaimer, the term of this patent is extended or adjusted under 35 U.S.C. 154(b) by 96 days.

(21) Appl. No.: 10/094,807

(22) Filed: Mar. 12, 2002

(65) Prior Publication Data

US 2002/0177651 A1 Nov. 28, 2002

(30) Foreign Application Priority Data

Mar. 16, 2001 (IT) ..................... MI2001A0554

(51) Int. Cl.$^7$ ................................ C08K 3/00
(52) U.S. Cl. .............. 524/515; 524/538; 525/178; 525/245; 525/420
(58) Field of Search ............... 524/515, 538; 525/178, 420; 526/245

(56) References Cited

U.S. PATENT DOCUMENTS

| | | | | |
|---|---|---|---|---|
| 2,242,218 | A | 5/1941 | Auer ........................... 91/70 |
| 3,242,218 | A | 3/1966 | Miller ....................... 260/615 |
| 3,665,041 | A | 5/1972 | Sianesi et al. .......... 260/516 A |
| 3,715,378 | A | 2/1973 | Sianesi et al. .............. 260/463 |
| 3,810,874 | A | 5/1974 | Mitsch et al. ................. 260/75 |
| 3,876,617 | A | * 4/1975 | Caporiccio et al. ......... 528/126 |
| 3,899,563 | A | 8/1975 | Oxenrider et al. ........... 264/211 |
| 4,278,776 | A | * 7/1981 | Mauro et al. ................ 525/178 |
| 4,523,039 | A | 6/1985 | Lagow et al. ................ 568/615 |
| 4,647,413 | A | 3/1987 | Savu .......................... 260/544 |
| 5,025,052 | A | 6/1991 | Crater et al. ................ 524/104 |
| 5,061,759 | A | 10/1991 | Tommasi et al. .......... 525/326.3 |
| 5,143,963 | A | 9/1992 | Sterling et al. ............. 524/366 |
| 5,149,842 | A | 9/1992 | Sianesi et al. .............. 549/550 |
| 5,258,110 | A | 11/1993 | Sianesi et al. ......... 204/157.92 |
| 5,286,773 | A | 2/1994 | Sterling et al. ............. 524/366 |
| 5,384,374 | A | 1/1995 | Guerra et al. ............. 525/326.4 |
| 5,451,622 | A | 9/1995 | Boardman et al. ........... 524/100 |
| 5,681,963 | A | 10/1997 | Liss ............................ 548/455 |
| 5,789,491 | A | * 8/1998 | Liss et al. ................... 525/420 |
| 6,380,336 | B1 | * 4/2002 | Soane et al. ................. 526/245 |

FOREIGN PATENT DOCUMENTS

| | | | |
|---|---|---|---|
| EP | 0 148 482 | | 7/1985 |
| EP | 0 239 123 | | 9/1987 |
| EP | 0 340 740 | | 11/1989 |
| EP | 0 616 013 | A2 | 9/1994 |
| GB | 1104482 | | 4/1965 |
| JP | 03115444 | * | 5/1991 |
| WO | WO 90/03357 | | 4/1990 |
| WO | WO 97/22576 | | 6/1997 |
| WO | WO 97/22659 | | 6/1997 |
| WO | WO 99/23147 | | 5/1999 |
| WO | WO 99/23148 | | 5/1999 |
| WO | WO 99/23149 | | 5/1999 |

* cited by examiner

*Primary Examiner*—David W. Wu
*Assistant Examiner*—Henry S Hu
(74) *Attorney, Agent, or Firm*—Arent Fox Kintner Plotkin & Kahn

(57) ABSTRACT

Additives for hydrogenated resins obtainable by using the following components:

a) bifunctional perfluoropolyethers having a —COOR end group, optionally in admixture with monofunctional perfluoropolyethers having a —COOR end group, b) mono, bi or polyfunctional hydrogenated monomers having functional groups able to react with the —COOR end groups of compound a);

c) polyolefins having functional groups able to react with the block oligomer/polymer obtained by reaction of a) with b), preferably said functional groups being obtained by grafting with maleic anhydride;

reacting in a first step a) with b), until disappearance of the —COOR group of component a), and in a second step the product obtained from the reaction of a) with b) with the functionalized polyolefins c).

11 Claims, No Drawings

ADDITIVES FOR HYDROGENATED RESINS

The present invention relates to fluorinated compounds usable as additives for hydrogenated resins, for example polyolefins, elastomers and polymers from, polycondensation. The additives of the invention do not negatively affect the processability during the extrusion of hydrogenated resins, on the contrary they improve it and the finished manifactured article shows an improved mould release. Besides, the finished manufactured article (hydrogenated resin added with the invention additives) shows lasting improved surface properties.

More particularly the present invention relates to additives formed by perfluoropolyether chains and functionalized polyolefins. Said additives can be obtained in solid form (granules, powder or pellets) and are compatible with hydrogenated polymers with which they form homogeneous mixtures. Therefore masterbatches at various additive concentrations, even very high, can be prepared, with hydrogenated resins, even of the order of 50% by weight of additive.

In the prior art the use of fluorinated additives to improve the polymer properties is known. U.S. Pat. No. 4,278,776 describes the use of polyamides obtained from perfluoropolyethers as process additives for blends of curable fluorinated rubbers. Tests carried out by the Applicant showed that polyamides obtained from perfluoropolyethers do not allow to prepare masterbatches with hydrogenated resins at high concentration of this additive. Besides even at low concentrations of this additive a homogeneous masterbatch is not obtained. Therefore these masterbatches are not in practice usable in extrusion since finished manufactured articles are obtained having non uniform properties. (See the comparative Examples). U.S. Pat. No. 5,061,759 describes perfluorinated perfluoropolyether additives or having bromine end groups for fluorinated rubbers curable by peroxidic way, the additive amount being in the range 0.5–1% by weight. These additives improve the processability of the fluorinated rubbers and the mould release. Also these additives when used for hydrogenated resins to obtain masterbatches to be used for preparing manufactured articles give the same drawbacks of the polyamides obtained from perfluoropolyethers.

U.S. Pat. No. 3,899,563 describes. monofunctionalized fluoro alkyl additives, such as amides, diamides, triazines, substituted ureas, for thermoplastic resins. In said patent no mention is made to the possibility to prepare masterbatches of above additives with hydrogenated resins, in particular no mention is made to polyolefins.

U.S. Pat. Nos. 5,143,963 and 5,286,773 describe fluorinated additives for hydrogenated thermoplastic polymers. Among the various additives, perfluoropolyether additives are mentioned and only perfluoropolyethers having perfluorinated end groups are exemplified. The additive amount is in the range 0.01%–<1% by weight. The finished manufactured articles have a surface tension lower than that of the thermoplastic polymer and show a higher fluorine content on the surface than inside the compound. The manufactured article is characterized by a higher hydrophobicity and antiadherence, a lower friction and a smoother surface. The fluorinated compounds used as additives can be under the form of oil, grease, or rubber. With these additives it is not possible to prepare masterbatches having a high content of additives, for example of 20% (see the comparative Examples). Besides, to additivate the liquid fluorinated compounds, particular equipments must be used so as to have a high mixing efficiency and therefore twin-screw extruders are used. Tests carried out by the Applicant have shown that by using the standard single screw extruders, widely used industrially, it is not possible to prepare masterbatches even at concentrations lower than 1% by weight.

U.S. Pat. No. 5,025,052 describes fluorinated dioxazolidinones as additives for thermoplastic resins. Also in this case no mention is made to the preparation of masterbatches with high additive concentrations.

U.S. Pat. Nos. 5,681,963 and 5,789,491 describe the use of imides based on monofunctional perfluoroalkyl compounds as additives in the production of fibers (polyolefins, polyesters, polyamides) water-repellent, alcohols and fluids having a low surface tension. In said patents it is stated that fluorinated polymer derivatives are not suitable for this kind of use due to their insufficient capability to migrate on the surface. Patent applications WO 97/22,576 and WO 97/22,659 describe the use of mono- and diesters of fat acids, excluding the stearic acid, with monofunctional fluoroalkyl alcohols to give idro/oilrepellent properties to polymer fibres, in particular polypropylene fibres. Also in this case the polymer additives are considered unsuitable as above mentioned.

Patent application WO 99/23,149 describes the preparation of manufactured articles resistant to creaking by addition of a generic fluorinated additive under the form of oil, wax or rubber, in amounts in the range 0.01%–5% by weight, to a hydrogenated polymer such as polyurethane or both thermoplastic and thermosetting resins. Also perfluoropolyethers even having functional end groups, and their homologues having a higher molecular weight, with a fluorine content higher than 50% belong to the class of fluorinated additives. In said patent application it is indicated that when the polymer is thermoplastic, to prepare these compositions the polymer is melted and mixed in the liquid state with the fluorocarbon additive, and the additive feeding into the mixing equipment takes place by addition devices for liquids. Therefore this mixing process shows the drawback to require a particular equipment since the components, as said, must be added at the liquid state. Also perfluoropolyethers having perfluoroalkyl end groups are indicated as usable. Also for said patent application the above same considerations are valid.

Patent application WO 99/23.148 describes manufactured articles resistant to abrasion obtained by addition of 0.01% up to 1% of one of the fluorinated additives described in the previous patent application for thermosetting resins. No reference is made to masterbatches.

Patent application WO 99/23,147 describes linear or crosslinked polymers having a Shore A hardness from 10 to 90, modified by addition of fluorinated additives in amounts between 1 and 10%, to obtain an improved abrasion resistance. In above patent application fluorinated additives oils, rubbers or greases formed by fluorocarbons which can contain functional groups are indicated as suitable. The mixing equipment is the one used to mix liquid compounds described in patent application WO 99/23,149 and therefore also this mixing process shows the same above mentioned drawback.

U.S. Pat. No. 5,451,622 describes the use of partially fluorinated piperazines with monofunctional fluoroalkyl segments, containing a fluorine amount between 20 and 70% by weight as hydro/oilrepellent additives for hydrogenated resins, such as for example polypropylene. Also in said patent no mention is made to masterbatches having a high concentration of additive.

Generally according to the above prior art the fluorinated additives can be used as process additives, or as additives to give improved surface properties to the finished manufactured article. The addition procedure of the fluorinated additive into the hydrogenated resin is generally a complicated step and requires, as seen, particular equipments for the dosage of the fluorinated additive in extrusion. The additive indeed is often under the liquid form and high efficiency equipments as twin-screw extruders for the homogeneization with the resin are required. With the liquid fluorinated additives of the prior art it is difficult to prepare masterbatches having a high additive concentration in the hydrogenated resin, in particular at concentrations higher than 10% by weight of additive. When perfluoropolyethers are used as additives, masterbatches having a maximum concentration of additive of 1–2% by weight can be prepared. (See comparative Examples). This is due to the substantial immisciability of the fluorinated additive with the hydrogenated resin which requires the use, as seen, of particular equipments. The lack of homogeneity in the masterbatch implies a difficult dosage of the additive in the final manufactured article, with the obtainment of manufactured articles which have no reproducible properties. This is a drawback from the industrial point of view. A further drawback is represented by the limited permanence in the time of the fluorinated additive in the manufactured article. In fact the additive can be removed by thermal effect during the working steps, or by—washing away, or by mechanical action, for example abrasion, with loss of the surface properties of the manufactured article and possible environmental pollution. At any rate no mention is made to masterbatch of additive in hydrogenated resin with high additive content, of the order of 50%. The possibility to have available masterbatches with a high content of additive allows to have masterbatches with a more uniform concentration of additive. Furthermore said masterbatches can be used with hydrogenated resins even different from those used to prepare masterbatches. This allows to obtain final resins having a more uniform distribution of the additive and therefore with substantially homogeneous properties and thus lower wastes during the production of manufactured articles.

The need was felt to have available fluorinated additives having the following properties:

were available in solid form (granules or pellets), and therefore measurable with normal loading hoppers, without necessarily requiring the use of particular batcher, were easily compatible with the hydrogenated resins, both thermoplastic and thermosetting, for example polyolefins, polyolefin rubbers, polyesters, polyamides, polyurethanes, also using single screw extruders, confer to the finished compound lasting surface hydro- and oilrepellence properties, abrasion resistance, low friction coefficient, improved mould release, possibility to prepare masterbatches at various, even very high, additive concentrations, with hydrogenated resins, even of the order of 50% by weight of additive.

The Applicant has surprisingly and unexpectedly found additives containing perfluoropolyether oligomers or polymers and functionalized polyolefins, having the combination of the above properties.

An object of the present invention are additives for hydrogenated resins, formed by functionalized perfluoropolyethers and functionalized polyolefins, said additives obtainable by using the following components:

a) bifunctional perfluoropolyethers having a —COOR end group, optionally in admixture with monofunctional perfluoropolyethers having —COOR end group, wherein R=H, $C_1$–$C_{10}$ alkyl, the number average molecular weight of bifunctional and monofunctional perfluoropolyethers being in the range 500–5,000, preferably 900–3,000;

b) mono, bi or polyfunctional hydrogenated monomers having functional groups capable to react with the —COOR end groups of compound a); preferably said functional groups of the hydrogenated monomers are aminic groups, c) polyolefins having functional groups, preferably formed by $C_2$–$C_4$ monomers, wherein said functional groups are capable to react with the block oligomer/polymer obtained by reaction of a) with b), preferably said functional groups being obtained by grafting with maleic anhydride;

reacting in a first step a) with b), or a) with mixtures of monomers b) having a different functionality, until disappearance of the —COOR group of component a), and in a second step the product obtained from the reaction of a) with b) with the functionalized polyolefins c).

The additive of the invention can optionally comprise neutral perfluoropolyether oils having a molecular weight in the range 2,000–10,000 (compound d)).

The amounts of each of the components a) –d), expressed as percentages by weight, are the following:

component a) 30–70% by weight;
component b) 1–30% by weight;
component c) 10–70% by weight;
component d) 0–20% by weight;
the sum of a)+b)+c)+d) being equal to 100% by weight.

The bifunctional (per)fluoropolyethers and the monofunctional perfluoropolyethers (component a)) have one or more of the following units statistically distributed along the chain: $(C_3F_6O)$; $(CFYO)$ wherein Y is F or $CF_3$; $(C_2F_4O)$; $(CF_2(CF_2)_{x'}CF_2O)$ wherein x' is an integer equal to 1 or 2; $(CR_4R_5CF_2CF_2O)$ wherein $R_4$ and $R_5$ are equal or different from each other and selected from H, Cl, and wherein one fluorine atom of the perfluoromethylene unit can optionally be substituted with H, Cl or (per)fluoroalkyl, having for example from 1 to 4 carbon atoms.

The preferred bifunctional compounds of a) are the following with the perfluorooxyalkylene units statistically distributed along the chain:

wherein:

p' and q' are numbers such that the q'/p' ratio is comprised between 0.2 and 2 and the number average molecular weight is in the above range;

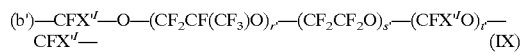

wherein:

$X'$ is —F or —$CF_3$; r', s' and t' are numbers such that r'+s' is in the range 1–50, the t'/(r'+s') ratio is in the range 0.01–0.05, r'+s' being different from zero, and the molecular weight is in the above range;

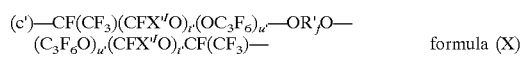

wherein:
R'$_f$ is a C$_1$–C$_8$ perfluoroalkylene; u'+t' is a number such that the number average molecular weight is in the above range; t' can also be equal to zero; X'$^t$ is as above indicated;

(d')—CF$_2$CF$_2$O—(CF$_2$(CF$_2$)$_x$CF$_2$O)$_{v'}$—CF$_2$CF$_2$— (XI)

wherein:
v' is a number such that the molecular weight is in the above range, x' is an integer equal to 1 or 2;

(e')—CF$_2$CH$_2$—(OCF$_2$CF$_2$CH$_2$O)$_{w'}$—OR'$_f$O—(CH$_2$CF$_2$CF$_2$O)$_{w'}$—CH$_2$CF$_2$— (XII)

wherein:
R'$_f$ is a C$_1$–C$_8$ perfluoroalkylene; w' is a number such that the number aaverage molecular weight is in the above range; the end groups of the bifunctional perfluoropolyethers component a) being of the —COOR type wherein R=H or C$_1$–C$_{10}$ alkyl.

The bifunctional (per)fluoropolyoxyalkylenes are known products and can be prepared starting from the corresponding (per)fluoropolyoxyalkylenes having —COF end groups (see for example patents GB 1,104,482, U.S. Pat. Nos. 3,715,378, 3,242,218, 4,647,413, EP 148,482, U.S. Pat. No. 4,523,039, EP 340,740, patent application WO 90/03357, U.S. Pat. No. 3,810,874, EP 239,123, U.S. Pat. Nos. 5,149,842, 5,258,110).

The preferred monofunctional perfluoropolyethers which are used in a) in admixture with bifunctional perfluoropolyethers have the following structures:

A—O(C$_3$F$_6$O)$_m$(CFYO)$_n$— IB)

wherein
Y is —F, —CF$_3$; A'=—CF$_3$, —C$_2$F$_5$, —C$_3$F$_7$, —CF$_2$Cl, C$_2$F$_4$Cl;
the C$_3$F$_6$O and CFYO units are randomly distributed along the (per)fluoropolyether chain, m and n are integers, the m/n ratio is ≧2, m and n have values such that the molecular weight is within the limits indicated for component a);

C$_3$F$_7$O(C$_3$F$_6$O)$_m$— IIB)

wherein m is a positive integer and is such that the average molecular weight is in the limits indicated for component a);

(C$_3$F$_6$O)$_m$(C$_2$F$_4$O)$_n$(CFYO)$_q$ IIIB)

wherein:
Y is equal to —F, —CF$_3$; m, n and q, different from zero, are integers such that the number average molecular weight is in the limits indicated for component a);
being the end group of the monofunctional perfluoropolyethers —CF$_2$—COOR, R being as above.

The compounds IB) are for example obtainable by photooxidation of hexafluoropropene according to the process described in patent GB 1,104,482; the compounds IIB) are for example obtainable by ionic telomerization of hexafluoropropene epoxide: see for example U.S. Pat. No. 3,242,218; the compounds IIIB) are for example obtainable by photooxidation of C$_3$F$_6$ and C$_2$F$_4$ mixtures by the processes described in U.S. Pat. No. 3,665,041.

The amount of monofunctional perfluoropolyethers in admixture with the bifunctional perfluoropolyethers is in the range 0–90% by weight of the mixture a), preferably 5–40%.

Examples of component b), when the functionality is aminic, are the following:

(b1) monoamines of formula R$_1$-NH$_2$ wherein R$_1$ is a linear aliphatic or cycloaliphatic C$_1$–C$_{20}$ alkyl with a number of carbon atoms of the ring from 4 to 6, optionally substituted with C$_1$–C$_4$ alkyl groups; or R$_1$ is an aryl group optionally substituted with linear or branched C$_1$–C$_4$ alkyl groups, the total number of the carbon atoms being in the range 6–20; an example of the amines of formula R$_1$—NH$_2$ is stearylamine;

(b2) diamines of formula NR$_{2A}$R$_{3A}$—R$_{1A}$—NH$_2$, wherein R$_{1A}$=linear or cycloaliphatic C$_2$–C$_{12}$ alkyl radical with a number of carbon atoms of the ring from 4 to 6, optionally substituted with C$_1$–C$_4$ alkyl groups, or C$_6$–C$_{12}$ aryl group; R$_{2A}$ and R$_{3A}$, equal to or different from each other, are hydrogen or linear or branched C$_1$–C$_5$ alkyl group; examples of diamines with R$_{1A}$=alkyl and R$_{2A}$=R$_{3A}$=H, are ethylendiamine and hexamethylendiamine; an example of diamine with R$_{1A}$=aryl is naphthalendiamine; an example of diamine with R$_{1A}$=alkyl and R$_{2A}$=R$_{3A}$=CH$_3$ is N,N-dimethylamino-ethylendiamine;

(b3) aromatic tetramines of formula (NH$_2$)$_2$—Ar1-Ar1-(NH$_2$)$_2$ with Ar1=phenyl, optionally substituted with C$_1$–C$_4$ alkyl groups; an example of aromatic tetramine is the tetramino biphenyl compound.

The preferred monomers b) are stearylamine (b1), still more preferably a compound of the classes (b2) and (b3).

In the component c) the functionalized polyolefins are for example the following polymers: polypropylene homopolymer, copolymers of polypropylene, high density polyethylene (HDPE), linear low density polyethylene (LLDPE) grafted with functionalized monomers capable to react with the aminic groups of the reaction product of a)+by. As an example of grafting monomer the maleic anhydride can be mentioned. Other components c) are copolymers or terpolymers of ethylene containing an ethylenic monomer having a second functional group, for example with vinyl acetate, and optionally in the presence of carbon oxide CO, for example EVA, E/nBa (n-butylacrylate) and E/nBA/CO.

The functionalized polyolefins component c) are commercially known and available products. For example the resins Fusabond® and Bynel® (DuPont), and the resins Questron® (Montell) can be mentioned.

The perfluoropolyether oils component d) have the same composition of units in the chain as described for component a), but they have perhalogenated end groups of the —CF$_2$X type, with X=F, Cl, preferably X=F. Said perfluoropolyethers are obtainable by known processes. See for example U.S. Pat. Nos. 3,665,041, 2,242,218, 3,715,378 and EP 239,123.

Admixtures of monomers b) having the same chemical function, for example stearylamine with hexamethylendiamine, can be used in the invention composition.

The additives according to the present invention are obtainable by a process comprising the following steps:

1) synthesis of the compound a)+b) by reaction of the functionalized perfluoropolyether component a), optionally formed by a mixture of a bifunctional and monofunctional perfluoropolyether, with the hydrogenated monomer component b), by heating under stirring at a temperature in the range 90°–100° C., and subsequently at 100°–130° C. under vacuum (1 mmHg) to complete the reaction, i.e. until in the IR spectrum the band at 1800 cm$^{-1}$ of the COOR group linked to —CF$_2$— disappears;
2) addition, under stirring, in the same reactor, of the functionalized polyolefin component c), preferably functionalized with maleic anhydride, and reaction of the mixture by heating at atmospheric pressure for 30–60 minutes at a temperature in the range 180° C.–190° C.; at the end hot discharge of the obtained product.

Step 1 is carried out by introducing in a polycondensation reactor, or in suitable mixing cell, equipped with stirrer, a mixture formed by the following components:
compound a), for example an ethyl or methyl diester of a perfluoropolyether, optionally in admixture with a perfluoropolyether monoester,
monomer b), optionally in admixture with other monomers b) having a different functionality; for example as component b) an aliphatic or aromatic diamine, optionally in admixture with monofunctional and/or polyfunctional amines having functionality higher than two, can be used;
the molar ratio between the functional groups of b) and a) is in the range 1–1.5, and anyway the amount of b) must be such to cause in the reaction the disappearance of the —COOR groups of a). The temperature of the reactor is then brought to a value in the range 90°–100° C., under stirring, collecting by distillation the released alcohol. When the distillation phase at atmospheric pressure is over, the polymer is heated to 100°–130° C. under vacuum (1 mmHg) to complete the reaction. The reaction ends when in the IR spectrum the band at 1800 cm$^{-1}$ of the COOR group linked to —CF$_2$— disappears.

The ratio between the monofunctional monomers and polyfunctional monomers of b) can be optimized in function of the molecular weight of a)+b) one wants to obtain.

The monomers b) react with the bifunctional perfluoropolyethers a), optionally in admixture with monofunctional perfluoropolyethers, giving for example polyamides and polybenzoimidazoles, the latter obtainable from the above mentioned aromatic tetramines (b3).

Optionally, to the compound obtained in the first step, fluorinated additives, such as for example the perfluoropolyether oil compound d) can be hot added, under stirring, in the amounts by weight within the above range.

In step 2) component c), the functionalized polyolefin, preferably with maleic anhydride, and the reaction product of a) with b) are introduced in the same reactor under stirring. It is heated at atmospheric pressure under stirring for 30–60 minutes at a temperature of 180°C.–190° C.; the discharged finished reaction product is a mass of homogeneous plastic material. In the second step the ratio between the functional groups of the compound obtained by reaction of a) with b) and the functional groups of the functionalized polyolefin ranges from 10 to 0.1 by moles, preferably it is about 1.

The additive obtained at the end is under solid form at room temperature and higher, generally up to 80° C., being characterized by a melting point generally higher than 80° C., and by a perfluoropolyether content in the chain higher than 50% by weight.

The so obtained invention additive, preferably after extrusion and pelletization, is used as additive to obtain homogeneous masterbatches with hydrogenated resins. The additive concentrations in the masterbatch are in the range 1–50% by weight.

Examples of hydrogenated resins are polyolefins such as HDPE, LLDPE, PP and respective copolymers, polyesters such as PET, polyamides as nylon, rubbers such as EPDM, etc.

The masterbatches are prepared for example by mixing the additive with hydrogenated resins, for example in a mixing cell, at temperatures in the range 170° C.–190° C. for 15–30 min, or by extrusion, under the operating conditions used for the hydrogenated resins.

Optionally, the product obtained from the reaction of component a) with component b) of the additive and then reacted with the component c) can be added to the hydrogenated resin.

For example, the reaction product of a)+b) can be added in a mixing cell or extruder to the hydrogenated resin and then the two phases compatibilized during the extrusion by adding granules of component c). The masterbatches are macroscopically homogeneous and defects free. It is industrially advantageous to have available masterbatches having a high additive concentration. In this case the masterbatch is used by adding the hydrogenated resin, in subsequent dilutions, until obtaining the desired fluorine content. During this processing, losses of additive or its components have not been noticed.n According to a non binding theory, it is considered that the fluorinated part, the perfluoropolyether compound a) chemically linked to the polyolefin c) cannot be extracted during the steps of the obtainment of the masterbatch. Besides, it has been found that the additive is not volatilized with the mentioned thermal treatments.

The finished manufactured article obtainable by mixing the masterbatches with hydrogenated resins is characterized by the combination of the above properties: hydrophobicity, resistance to low surface tension liquids, resistance to abrasion, and low friction coefficient, and maintenance of these properties in the time.

A further advantage of the invention additive unexpectedly found by the Applicant is that it can be used also to carry in the hydrogenated resin other fluorinated additives, such as non functionalized perfluoropolyether oils (component d)), without requiring the use in extrusion of liquid batchers, obtaining an improved final homogeneity and persistence of the perfluoropolyether oil, in the manufactured article in use. Indeed, as said, a drawback of the use of non reactive perfluoropolyether oils as additives for hydrogenated resins is that their effect on the hydrogenated resins is very limited in the time.

The additive of the present invention is characterized by its rheological properties, thermal analysis (differential calorimetry and thermogravimetry) and IR spectroscopy.

As already said, the additive of the invention improves the processing properties and confers also properties of improved mould release from the of the finished manufactured article.

The manufactured article can be subjected to a second thermal treatment by heating at a temperature in the range 100°–140° C. to further improve the above mentioned surface properties.

The following Examples illustrate the invention without limiting the scope thereof.

EXAMPLES

Analytical Methods

The dynamic viscosity was determined at 30° C., Ares rheometer having parallel plates, frequency 0.83 rad/s.

The aminic equivalent weight NH$_2$ was determined by potentiometer titration, dissolving about 5 g of polymer in 50 ml of a 9:1 solution (v/v) of trichlorotrifluoroethane:methanol, and titrating by a potentiograph with an alcoholic solution of HCl 0.1 N.

The thermal transitions (Tg and Tm) were determined by a Perkin Elmer® DSC 2 instrument by using the following thermal procedure: heating from 50° to 180° C. at 10° C./min, isotherm at 180° C. for 5 min, cooling from 180° C. to 50° C. at 100C./min, isotherm at 50° C. for 2 min, heating from 50° C. to 180° C. at 10° C./min.

The tensile properties were determined at 23° C. according to ASTM D1708 (5 mm/min rate) with an Instrom® mod. 1185 dyna-mometer.

The static contact angle with n-hexadecane was determined by the method of the sessile drop with a Kruss® G23 instrument at room temperature. The angle measure was taken by photograph after 30 seconds of contact of the drop with the surface.

Example 1

Synthesis of the Polyamide Obtained by Reaction of Ethylendiamine with a Perfluoropolyether Bifunctional Ester 30 g of ethylendiamine and 1 Kg of an oil formed by the perfluoropolyether methyl diester having molecular weight 2,000 and the following structure:

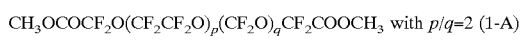

$CH_3OCOCF_2O(CF_2CF_2O)_p(CF_2O)_qCF_2COOCH_3$ with $p/q=2$ (1-A)

are fed into a 2 liters polycondensation reactor equipped with stirrer.

The reaction mixture is heated under nitrogen atmosphere for 4 hours, distilling the methanol released during the polycondensation. At the end the inside of the reactor is connected with the vacuum source (1 mmHg) heating at 100° C. for further 4 hours. At the end the initial pressure is restored in the reactor and the perfluoropolyether polyamidic derivative is hot discharged from the reactor bottom under the form of a viscous oil.

In the IR spectrum of the polyamidic derivative the absorption band at 1800 cm$^{-1}$ of the —CF$_2$COOCH$_3$ groups is absent, therefore all the ester groups of the starting perfluoropolyether were converted to amidic groups (1690 cm$^{-1}$). The polyamide shows the following physical characteristics:

Viscosity: 32.000 Poise (3.2×10$^3$ Pa).
Thermal transitions (DSC, 20° C./min): −104° C.; −20° C.
Aminic equivalent weight NH$_2$: 23,000 g/eq.

Example 2

Synthesis and Characterization of the Polyamide Obtained by Reaction of Hexamethylendiamine with a Perfluoropolyether Bifunctional Ester 60 g of hexamethylendiamine and 1 Kg of perfluoropolyether methyl diester oil having molecular weight 2,000 and the following structure:

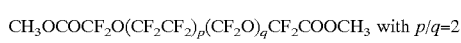

$CH_3OCOCF_2O(CF_2CF_2)_p(CF_2O)_qCF_2COOCH_3$ with $p/q=2$ are fed in a 2 liters polycondensation reactor equipped with tape stirrer.

The reaction mixture is heated under nitrogen atmosphere for 4 hours, distilling the methanol polycondensation by-product. Then the vacuum source (1 mmHg) is connected, heating at 120° C. for further 4 hours. The perfluoropolyether polyamide is hot discharged from the reactor bottom under the form of a viscous oil.

In the IR spectrum of the polyamide the absorption band at 1800 cm$^{-1}$ is absent, characteristic of the —CF$_2$COOCH$_3$ groups. Therefore all the ester groups are converted to amidic groups (band at 1690 cm$^{-1}$). The polyamide is characterized in terms of thermal transitions (by DSC) and viscosity (flow curve at 30°):

Viscosity: 70,000 Poise (7.10$^3$ pa).
Thermal transitions (DSC, 20° C./min): −107° C.; −40° C.

Example 3

Synthesis and Characterization of the Polyamide Obtained by Reaction of Bis-stearylamide with a Perfluoropolyether Bifunctional Ester In a 2 liters 3-necked glass flask equipped with mechanical stirring, nitrogen atmosphere and distillation retort, 500 g of the perfluoropolyether diester of formula (1-A) but having molecular weight 1,500, and 180 g of stearylamine are introduced. The reation mixture is heated under stirring to 70°–80° C. distilling the released methyl alcohol. After a reaction time of 4 hours the vacuum source (1 mmHg) is connected, which is maintained for 2 hours. It is cooled and a solid having a waxy consistency is discharged from the reactor. The IR analysis shows the absence of the band at 1800 cm$^{-1}$ (ester group linked to a CF$_2$ group).

Thermal transitions (DSC, 20° C./min): −80° C. (Tg); +40° C. (Tm).

Example 4

Preparation of the Additive by Reaction of a Polyamidic Perfluoropolyether Derivative with Functionalized Polyethylene 500 g of the fluorinated polyamide obtained in Example 2 and 500 g of granules of polyethylene functionalized with maleic anhydride, having the following characteristics: Melt Flow Index MFI (190° C., 2.16 Kg, ASTM D1238) 4.2 g/10 min; content in maleic anhydride 0.4% by weight; Tm 80° C., are introduced in a 2 liters polycondensation reactor.

The mass is heated under stirring to 190° C. for one hour. At the end about 900 grams of a white solid, having a consistency like plastic, having the following properties, are discharged:

Thermal transitions (DSC, 20° C./min): −100° C. (Tg); +93° C. (Tm)
Thermal stability (TGA, dynamic at 10° C./min from 20° C. to 700° C.): T$^{1\%}$ (temperature at which a weight loss of 1% of the tested sample occurs): 362° C.

Example 4b

Characterization of the Mechanical Properties of the Additive of Example 4

The additive of Example 4 is moulded in press (200° C., 5 min) obtaining specimens which are subjected to tensile mechanical and dynamic-mechanical characterization by an Instrom® mod. 1185 dynamometer according to ASTM D1708 and by an Ares®3-A25 spectrometer having parallel plates according to ASTM D4065 with a heating gradient of 2° C./min and 6.28 rad/s frequency.

The moulded additive is a solid. Indeed the specimens maintain the dimensional stability even after heating at 50° C. for 72 hours. The deformation imposed with the ASTM test (500%) is not recovered after specimen cooling to room temperature. It is noticed that the deformation recover is lower than 1% after conditioning of the specimens for 24 h at room temperature. The dynamic-mechanical additive spectrum shows, at room temperature, a modulus G' value (elastic component) of about 1–2 MPa and a G" value (viscous component) of about 0.01 MPa.

Over the melting point (110°–120° C.) G">G'.

The additives of the invention therefore are not waxy or rubbery substances, but they are more properly classifiable as plastic materials.

Example 5
Preparation of the Additive by Reaction of a Polyamidic Perfluoropolyether Derivative with Functionalized Polypropylene 500 g of the fluorinated polyamide obtained in Example 1 and 500 g of granules of polypropylene functionalized with maleic anhydride, having the following characteristics: Melt Flow Index (determined as in Example 4) 28 g/10 min; content in maleic anhydride 0.6% by weight; Tm 152° C., are introduced in a 2 liters polycondensation reactor The mass is heated under stirring to 190° C. and kept at this temperature for one hour. At the end about 900 grams of a white solid, having a consistency like plastic, with the following properties, are discharged:

MFI (190° C., 2.16 kg, ASTM D 1238) 210 g/10 min.
Thermal transitions (DSC, 20° C./min): −100° C. (Tg); +150° C. (Tm).
Thermal stability (TGA, dynamic at 10°C./min from 20° C. to 700° C): $T^{1\%}$ (temperature at which a weight loss of 1% of the tested sample occurs): 350° C.

Example 6
Preparation of an Additive of the Invention in Admixture with a Non Reactive Perfluoropolyether Oil (Fomblin® YR) and Preparation of Masterbatches with Polyolefins A mixture formed by the following components is prepared: 450 g of the polyamide obtained in Example 1, 50 g of perfluoropolyether having non reactive (perfluorinated) end groups Fomblin® YR 1800 and 500 g of functionalized polypropylene having the proprties indicated in the previous Example 5 (MFI 115, anhydride 0.6% by weight).

The process mentioned in example 4 is followed.

After 2 hours of mixing, a white plastic, macroscopically homogeneous, solid is discharged, without emerging signs of oily residues on the solid surface or on those of the reactor.

The product is added to polyolefins such as polypropylene and polyethylene to give homogeneous masterbatches having additive concentrations in the range 5–20%, without noticing the typical problems caused by the use of non reactive PFPE oils.

Example 7
Use of the Additive of Example 4 as Additive for HDPE (Processing Aid)

A masterbatch formed by 20 parts by weight of additive of Example 4 with 80 parts by weight of HDPE was prepared. The used polyolefin is characterized by MFI of 1 g/10 min (190° C./2.16 Kg). The masterbatch was prepared by charging the components in a Brabender mixing cell at 180° C. for 30 min (30 rpm rate). The masterbatch cold discharged from the cell appears as a macroscopically homogeneous white plastic solid. The masterbatch was further diluted with HDPE to an additive content of 4% and 1% respectively, by adding further HDPE in Brabender cell at 170° C. for 30 min (30 rpm rate).

The 20% and 4% masterbatches were then moulded in a plate press (230° C. for 5 min) and characterized in terms of mechanical (tensile), dynamic-mechanical and thermal (DSC calorimetry) properties to evaluate the homogeneity degree of the additive distribution and its effect on the most important physical properties of the polyolefin. The tensile properties were determined at 23° C. by an Instrom® mod. 1185 dynamometer according to ASTM D1708 (5 mm/min rate), while the thermal transitions (meltings) were determined by using the following thermal procedure: heating from 50° to 180° C. at 10° C./min, isotherm at 180° C. for 5 min, cooling from 180° C. to 50° C. at 10° C./min, isotherm at 50° C. for 2 min, heating from 50° C. to 180° C. at 10° C./min. The dynamic-mechanical properties were carried out by rheogoniometer Ares (temperature gradient 2° C./min, frequency 6.28 rad/s).

Table 1 reports the characterization data of the HDPE and of the mixtures with the additive of Example 4.

The fluorinated additive results homogeneously distributed also at the highest concentration (20%) and it substantially acts as a plasticizer, since the specimen containing the additive shows a modulus decrease and an increase of the elongation at break with respect to the specimen without the additive. The melting point does not change, therefore there are neither alterations of the polyolefin crystallinity, nor interactions at a molecular level. The melting enthalpy decreases in an approximately proportional way to the content of the fluorinated additive in the blend, confirming that there are no meaningful losses of the additive during the preparation steps of the masterbatches.

Example 8
Use of the Additive of Example 5 to Modify the Surface PP Properties (Added Additive Amount 1–3%)

A masterbatch formed by 20 parts by weight of additive of Example 5 and by 80 parts of polypropylene having MFI equal to 34 g/10 min (230° C., 2.16 kg), was prepared. The masterbatch was prepared by charging the components in a Brabender mixing cell at 190° C. for 20 min (30 rpm rate).

The masterbatch cold discharged from the cell appears as a macroscopically homogeneous white, plastic solid. The masterbatch at 20% of additive was milled in a screw propeller mill at room temperature. Subsequently blends with PP having additive concentrations of 1% and 3% respectively were prepared in a Brabender cell, following operating modalities similar to those described in Example 7.

The additivated PP was then moulded in a plate press at 230° C. for 5 min between 2 aluminum sheets having a 0.3 mm thickness.

The surface of the PP plates was characterized by determining the contact angle with water and, respectively, with hydrocarbons to determine the hydrorepellence and the surface resistance to liquids having a low surface tension. The static contact angle with n-hexadecane was measured by the sessile drop method by a Kruss® G23 instrument at room temperature. The angle measure was taken by photograph after 30 seconds of contact of the drop with the surface.

The results are reported in Table 2.

From the Table it results that hexadecane completely wets the polypropylene surface (oleophilic, non resistant to liquids of low surface tension). The hexadecane on the additived polypropylene forms discrete and stable drops with measurable contact angles. The fluorinated additive, notwithstanding its polymer nature, is therefore able to appear on the surface lowering the surface energy. In particular it is observed that by thermal post-treatment cycles at 135° C., and with percentages of additive higher than 1%, hexadecane drops having a high contact angle, of the order of 40°–50°, can be obtained. This means that the polypropylene additived with the additives of the present invention becomes oleorepellent and non wettable by liquids having a low surface tension, also of hydrocarbon nature.

The measurements of the contact angle with water show an increase of the contact angle with water from 80°–90° for PP as such at 98°–102° for the additived polyolefin.

Example 9 (Comparative)
Homogeneity Evaluation of the Mixtures of HDPE and a Perfluoropolyether (Fomblin®)

According to known addition processes of the prior art, different amounts of perfluoropolyether oil Fomblin® YR were adsorbed in the deliberately created porosities of the hydrogenated resin HDPE. In this way HDPE mixtures containing various amounts of the fluorinated oil were prepared.

The used Fomblin® YR 1800 had the following physical properties:

Molecular weight Mn (NMR): 7,250.
Kinematic viscosity (ASTM D455, 20° C.): 1,850 cSt ($1.85.10^9$ m²/s).
Density (ASTM D891, 20° C.): 1.2 g/ml.

The mixtures containing an amount by weight of perfluoropolyether higher than 2% are macroscopically heterogeneous and show the presence of oily residues on the surface and local unhomogeneities, such as for example craters and accumulations. Mixtures containing respectively concentrations of 2% and 0.5% by weight of Fomblin® YR 1800 were prepared in mixing cell. From the mixtures specimems were moulded according to the procedure described in Example 7. The tensile properties of the obtained specimens were determined at 23° C. according to ASTM D1708.

The obtained results are reported in Table 3.

From the examination of the Table it is shown that while the modulus of the specimens corresponding to the different mixtures remains substantially unchanged, in the material containing 2% of additive there is a substantial worsening of the break properties (stress and elongation at break). This means that in the moulded material the additive distribution is not homogeneous and defects are present.

It is therefore not possible to prepare masterbatches with this mixture.

Example 10 (Comparative)
Test of Preparation of the Masterbatch of the Polyolefin with the Perfluoropolyether Polyamide 10 g of fluorinated polyamide of Example 1 and 90 g of PP having MFI=34 g/10 min are introduced into a Brabender mixing cell. The blend is heated at 190° C. for 30 minutes (stirring blade rate 30 rpm). At the end it is cooled at room temperature and discharged. In the cooled mass an unhomogeneous distribution of the polymer fluorinated additive in the polyolefin is macroscopically observed, with surfacing of liquid and viscous phases which can be mechanically removed.

The fluorinated additive is therefore not compatible with the polyolefin.

The result does not change by heating the blend at a higher temperature (230° C.), or using in the blend the polyamide of Example 2, or substituting PP with HDPE.

It is therefore not possible to prepare homogeneous masterbatches with polyolefins by replacing the invention additive with the fluoropolyether polyamides which are an additive component.

Example 11
Proof of the duration in the time of the surface hydra- and oleo-repellence properties of a polyolefin resin additivated with the invention additive in an amount of 3% by weight.

An amount of masterbatch at 20% prepared in Example 8 was added to a PP sample so as to have a final amount of additive equal to 3% by weight. A specimen of the so prepared resin, obtained by moulding between two aluminum sheets as described in Example 8, is kept suspended for 8 hours over a becker half full of distilled water maintained at the boiling temperature.

At the end the specimen is dried and the contact angle is determined both with water and with n-hexadecane, obtaining the values shown in Table 4, wherein the contact angle values in the two solvents of the untreated specimens are reported by reference.

The test shows that the specimen maintains the hydra- and oleo-repellence properties even after quick ageing by contact with water vapours for the above indicated time.

Example 12
Synthesis and Characterization of the Tertiary Bis-amide, Produced by Reaction of the Components a)+b)

144 g of N,N-diethylethylendiamine and 1 Kg of diethyl ester perfluoropolyether having molecular weight 600 and the following structure:

$C_2H_5OCOCF_2O(CF_2CF_2O)_p(CF_2O)_qCF_2COOC_2H_5$ with $p/q=2$ are introduced in a 2 liters polycondensation reactor, equipped with anchor stirrer.

The reaction mixture is heated at 80° C. under nitrogen atmosphere for two hours while the ethanol which is released during the polycondensation is distilled. The temperature is increased to 100° C. and the reactor is connected to the vacuum source (1 mm Hg) for 4 hours.

The obtained product is hot discharged from the reactor bottom which appears in the form of a yellow-brown coloured oil.

Viscosity at 20° C.: 50 mpa.s.

Example 13
Preparation of the Additive in Functionalized Polyethylene

In a 2 liters polycondensation reactor 500 g of polyethylene functionalized with maleic anhydride are introduced, having the following properties:

Melt Flow Index (ref. Ex. 4): 4.2 g/10 min,
Maleic anhydride content: 0.4% by weight,
Tm 90° C.

The mass, is melted at 120° C. and 500 g of the fluorinated amide prepared in Example 12 are added, heating for one hour. 1000 g of a plastic white solid which is milled and powdered, are discharged.

Example 13A
Preparation of a masterbatch by reaction of the product obtained by reaction of a) with b) with the functionalized polyolefin c) directly in the hydrogenated resin.

The masterbatch is prepared by introducing the components in Brabender mixing cell at 230° C. for 20 minuti (30 rpm rate), mixing 10 parts by weight of tertiary bis-amide of Example 12 with 5 parts by weight of polyethylene functionalized with maleic anhydride equal to that used in Example 13 and 85 parts by weight of polypropylene having MF (ASTM D1238) 34 g/10 min. The obtained masterbatch appears as a macroscopically homogeneous plastic solid.

Example 13B (Comparative)
Compatibility Test of the Compound Obtained from the Reaction of a)+b) with the Hydrogenated Resin Example 13A is repeated omitting the addition of polyethylene functionalized with maleic anhydride.

In the mixing cell, operating under the same conditions, one does not succeed in forming a homogeneous mixture of the tertiary bis-amide with polypropylene.

Example 14

Use of the Additive Prepared in Example 13 to Modify the Surface Polypropylene Properties A masterbatch formed by 10 parts by weight of the additive prepared in Example 13 with 90 parts by weight of polypropylene having MFI (ASTM D1238) 34 g/10 min is prepared, feeding the two components in a Brabender mixing cell at 230° C. for 20 min. (30 rpm rate). The masterbatch is cold discharged from the mixing cell and it appears as a macroscopically homogeneous white solid. Then it is milled in a screw propeller mill.

The masterbatch is further mixed with another aliquot of the same above used polypropylene so as to obtain a final concentration of additive of 2%.

The following specimens are prepared:

polypropylene used for preparing the masterbatch;

the masterbatch (concentration 10% by weight of additive) and of the added polypropylene to the masterbatch (concentration 2% of additive).

The specimens are prepared by moulding the material in press at 230° C. for 5 min. between two aluminum sheets. The specimen thickness is of 0.3 mm. The oleo-repellence test is carried out on one of the two surfaces of the specimens to verify the resistance of the specimen surface to liquids.

The static contact angle with water-hexadecane is determined.

The results are reported in Table 5, which shows that also at a concentration of 2% in the resin, the additive is able to confer to the material oleo-repellence, since the contact angle keeps on high values, comparable with those of the specimen prepared from the masterbatch.

Example 15

Resistance Test to Abrasion on PP Specimens Containing 3% by Weight of Additive

Specimens with the composition of Example 11, prepared as described in Example 8 and having a 0.3 mm thickness, are subjected to an abrasion cycle using a Taber abrasimeter, CD10 grindstone, according to ASTM D1044. At the end of the abrasion cycle the specimen thickness was reduced of about 5 microns, which corresponds to about 1.5% of the thickness.

After having cleaned the treated surface of the specimen, the contact angle with water and with n-hexadecane is determined. The results are reported in Table 4.

The obtained data show that the hydro- and oleo-repellence properties are substantially maintained also by the new surface of the specimen formed with the abrasion cycle. The test shows that the additive is distributed in a substantially homogeneous way in the specimen.

TABLE 1

Example 7: tensile properties and thermal transitions of HDPE and of the respective masterbatches with the additive of Ex. 4 at 4% and 20% by weight concentrations

|  |  | HDPE | HDPE + additive conc. 4% | HDPE + additive conc. 20% |
|---|---|---|---|---|
| modulus (MPA) |  | 830 | 646 | 665 |
| stress at break (MPA) |  | 32.4 | 34.8 | 29.3 |
| strain at break (%) |  | 647 | 730 | 763 |
| Tf* | (DSC, ° C.) | +130 | +130 | +130 |
| ΔHf** | (DSC, J/g) | 181 | 173 | 153 |
| Tg | (DMS, ° C.) | n.d. | −118 | −119 |

*Melting point in second scanning
**Second melting enthalpy

TABLE 2

Example 8: use of the additive of Ex. 5 to modify the surface properties (resistance to liquids having a low surface tension) of the polypropylene

| % by weight of additive | Contact angle (n-hexadecane) |
|---|---|
| 0 | 0°*** |
| 1 | 10°–15° |
| 3 | 22°–28° |
| after specimen re-baking at 135° C. for 4 min. | |
| 0 | 0°*** |
| 1 | 18°–20° |
| 3 | 45°–50° |

***Completely wetted surface

TABLE 3

Example 9 comparative: tensile properties and thermal transitions of HDPE and of the respective masterbatches with Fomblin ® YR at concentrations 0.5% and 2% by weight

|  |  | HDPE | HDPE + Fomblin ® YR conc. 0.5% | HDPE + Fomblin ® YR conc. 2% |
|---|---|---|---|---|
| modulus (MPA) |  | 830 | 930 | 900 |
| stress at break (MPA) |  | 32.4 | 31.5 | 20.5 |
| strain at break (%) |  | 647 | 680 | 190 |
| Tf* | (DSC, ° C.) | +130 | +130 | +130 |
| ΔHf** | (DSC, J/g) | 181 | 173 | 153 |
| Tg | (DMS, ° C.) | n.d. | −118 | −119 |

TABLE 4

Examples 11 and 15: resistance test to quick ageing and resistance test to abrasion on PP specimens containing a final amount of additive of 3% by weight.

|  | Contact angle | |
|---|---|---|
| Specimen treatment | water | (n-hexadecane) |
| Untreated specimen | 93°–102° | 45°–50° |
| Quick ageing (Ex. 11) | 103° | 40° |
| Abrasion test (Ex. 15) | 100° | 38° |

TABLE 5

Example 14: use of the masterbatch prepared according to Example 13 to modify the surface properties (resistance to liquids having a low surface tension) of polypropylene

| % by weight of additive | Contact angle (n-hexadecane) |
|---|---|
| 0 | 0° |
| 2 | 58°–60° |
| 3 | 65°–70° |

What is claimed is:

1. Additives for hydrogenated resins, formed by functionalized perfluoropolyethers and functionalized polyolefins, said additives being obtained by reacting the following components:

a) bifunctional perfluoropolyethers having a —COOR end group optionally in admixture with monofunctional perfluoropolyethers having —COOR end group, wherein R=H, $C_1$–$C_{10}$ alkyl, the number average molecular weight of bifunctional and monofunctional perfluoropolyethers being in the range 500–5,000, b) mono, bi or polyfunctional hydrogenated monomers having as functional groups aminic groups, c) polyolefins having functional groups, said polyolefin formed by $C_2$–$C_4$ monomers, said functional groups obtained by grafting with maleic anhydride;

reacting in a first step a) with b), or a) with mixtures of monomers b) having a different functionality, until disappearance of the —COOR end group of component a), and in a second step reacting the product obtained from the reaction of a) with b) with the functionalized polyolefins c).

2. Additives according to claim 1, further comprising neutral perfluoropolyether oils having a molecular weight in the range of 2,000–10,000 component d)).

3. Additives according to claim 2, wherein the amounts of each component a)–d), expressed as percentages by weight, are the following:
   component a) 30–70% by weight;
   component b) 1–30% by weight;
   component c) 10–70% by weight;
   component d) 0–20% by weight;
   the sum of a)+b)+c)+d) being equal to 100% by weight.

4. Additives according to claim 1, wherein the bifunctional (per)fluoropolyethers and the monofunctional perfluoropolyethers mentioned in a) have one or more of the following units statistically distributed along the chain:

$(C_3F_6O)$; $(CF_2(CF_2)_{x'}CF_2O)$ wherein x' is an integer equal to 1 or 2; (CFYO) wherein Y is F or $CF_3$; $(C_2F_4O)$; $(CR_4R_5CF_2CF_2O)$ wherein $R_4$ and $R_5$ are equal to or different from each other and selected between H or Cl, and wherein one fluorine atom of the perfluoromethylene unit is optionally substituted with H, Cl or (per)fluoroalkyl having from 1 to 4 carbon atoms.

5. Additives according to claim 4, wherein the bifunctional compounds of a) having perfluorooxyalkylene units statistically distributed along the chain are selected from the group consisting of:

(a') —$CF_2$—O—$(CF_2CF_2O)_{p'}(CF_2O)_{q'}$—$CF_2$—     (VIII)

wherein:
   p' and q' are numbers such that the p'/q' ratio is comprised between 0.2 and 2 and the molecular weight is in the above mentioned range;

(b') —$CFX^{'t}$—O—$(CF_2CF(CF_3)O)_{r'}$—$(CF_2CF_2O)_{s'}$—$(CFX^{'t}O)_{t'}$—$CFX^{'t}$—     (IX)

wherein:
   $X^{'t}$ is —F or —$CF_3$; r', s' and t' are numbers such that r'+s' is in the range 1–50, the t'/(r'+s') ratio is in the range 0.01–0.05, r'+s' being different from zero, and the molecular weight is in the above mentioned range;

(c') —$CF(CF_3)(CFX^{''}O)_{t'}(OC_3F_6)_{u'}$—$OR'_fO$—$(C_3F_6O)_u$·$(CFX^{''}O)_{t'}CF(CF_3)$—     (X)

wherein:
   $R'_f$ is a $C_1$–$C_8$ perfluoroalkylene; u'+t' is a number such that the molecular weight is in the above range; t' can also be equal to zero; $X^{'t}$ is as above indicated;

(d') —$CF_2CF_2O$—$(CF_2(CF_2)_{x'}CF_2O)_{v'}$—$CF_2CF_2$—     (XI)

wherein:
   v' is a number such that the molecular weight is in the above range, x' is an integer equal to 1 or 2; or (e') —$CF_2CH_2$—$(OCF_2CF_2CH_2O)_{w'}$—$OR'_fO$—$(CH_2CF_2CF_2O)_{w'}$—$CH_2CF_2$—     (XII)

wherein:
   $R'_f$ is a $C_1$–$C_8$ perfluoroalkylene; w' is a number such that the molecular weight is in the above range;
   the end groups of the bifunctional perfluoropolyethers component a) being of the —COOR type wherein R=H or $C_1$–$C_{10}$ alkyl.

6. Additives according to claim 4, wherein the monofunctional perfluoropolyethers used in a) in admixture with bifunctional perfluoropolyethers have the following structures:

$A'O(C_3F_6O)_m(CFYO)_n$—     IB wherein Y is —F, —$CF_3$; A'=—$CF_3$, —$C_2F_5$, —$C_3F_7$, —$CF_2Cl$, $C_2F_4Cl$; the $C_3F_6O$ and CFYO units are randomly distributed along the (per)fluoropolyether chain, m and n are integers, the m/n ratio is $\geq 2$, m and n have values such that the molecular weight is within the limits indicated for component a);

$C_3F_7O(C_3F_6O)_m$—,     IIB wherein m is a positive integer and is such that the number average molecular weight is in the limits indicated for component a);

$(C_3F_6O)_m(C_2F_4O)_n(CFYO)_q$     IIIB wherein:
   Y is equal to —F, —$CF_3$; m, n, and q, different from zero, are integers such that the number average molecular weight is in the limits indicated for component a);
   being the end group of the monofunctional perfluoropolyethers —$CF_2$—COOR, R being as above.

7. Additives according to claim 1, wherein the amount of monofunctional perfluoropolyethers in the mixture with the bifunctional perfluoropolyethers in a) is in the range 0–90% by weight.

8. Additives according to claim 1, wherein the monomers component b), are selected from the group consisting of:
- (b1) monoamines of formula $R_1$—$NH_2$ wherein $R_1$ is a linear aliphatic or cycloaliphatic $C_1$–$C_{20}$ alkyl with a number of carbon atoms of the ring from 4 to 6, optionally substituted with $C_1$–$C_4$ alkyl groups; or $R_1$ is an aryl group optionally substituted with linear or branched $C_1$–$C_4$ alkyl groups, the total number of the carbon atoms being in the range 6–20;
- (b2) diamines of formula $NR_{2A}R_{3A}$—$R_{1A}$—$NH_2$, wherein $R_{1A}$=linear or cycloaliphatic $C_2$–$C_{12}$ alkyl radical with a number of carbon atoms of the ring from 4 to 6, optionally substituted with $C_1$–$C_4$ alkyl groups, or $C_6$–$C_{12}$ aryl group; $R_{2A}$ and $R_{3A}$, equal to or different from each other, are hydrogen or linear or branched $C_1$–$C_5$ alkyl group;
- (b3) aromatic tetramines of formula $(NH_2)_2$—Ar1—Ar1—$(NH_2)_2$ with Ar1=phenyl, optionally substituted with $C_1$–$C_4$ alkyl groups.

9. Additives according to claim 8, wherein the component b) is selected from the group consisting of stearylamine, a compound of (b2) and a compound of (b3).

10. Additives according to claim 1, wherein in component c) the functionalized polyolefins are selected from the group consisting of the following polymers:
- polypropylene homopolymer, copolymers of polypropylene, high density polyethylene (HDPE), linear low density polyethylene (LLDPE) grafted with functionalized monomers capable of reacting with the aminic groups of the reaction product of a)+b), or
- copolymers or terpolymers of ethylene containing an ethylene monomer selected from vinyl acetate (VA) or n-butylacrylate (E/nBa), optionally in the presence of carbon oxide (CO).

11. Additives according to claim 2, wherein the end groups are perhalogenated with —$CF_2X$, with X=F or Cl.

* * * * *